E. FIELD.
ELECTRICAL ANTI-INCRUSTATOR FOR STEAM GENERATORS.
No. 194,666. Patented Aug. 28, 1877.
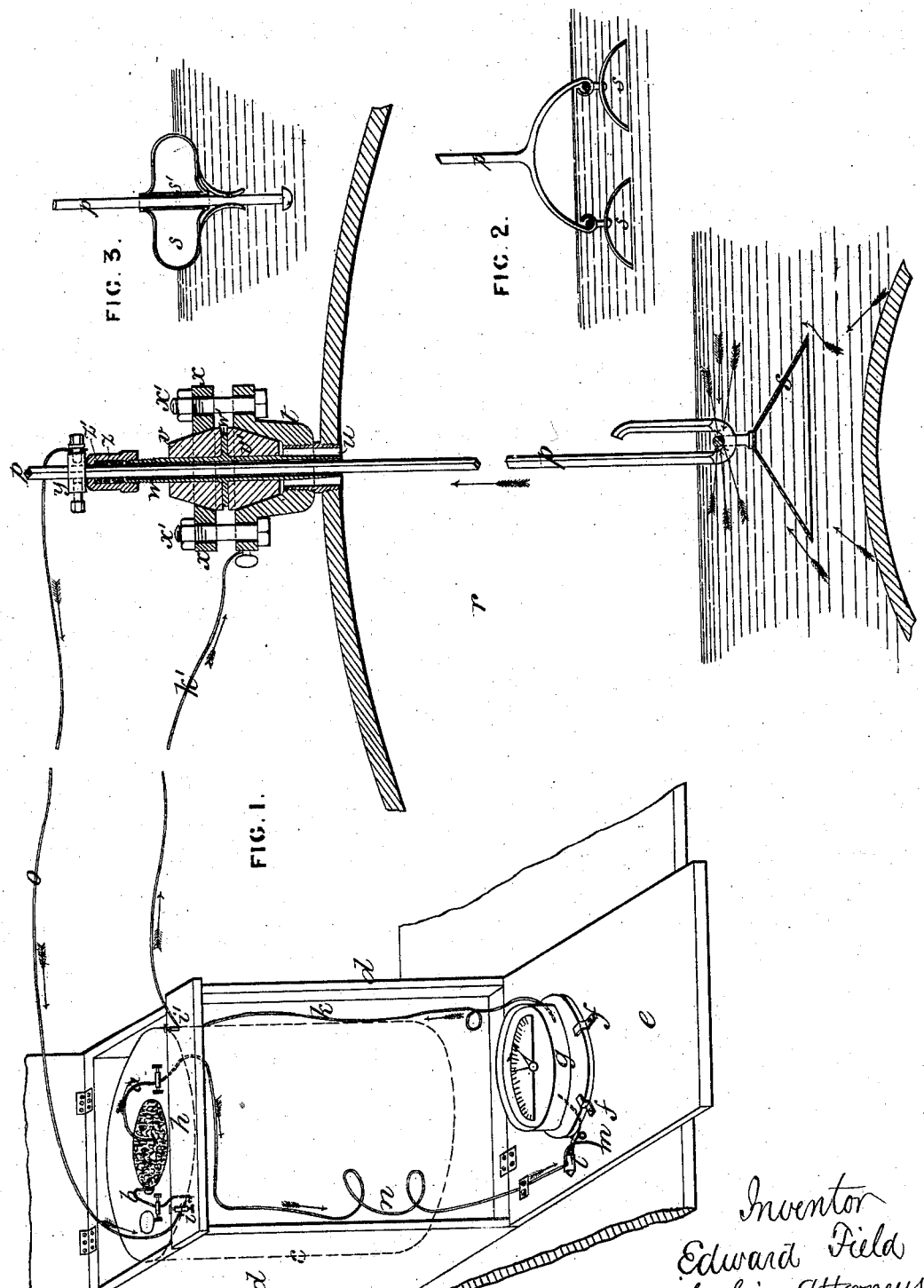
Witnesses
Henry Howson Jr.
Harry Smith
Inventor
Edward Field
by his Attorneys
Howson and

UNITED STATES PATENT OFFICE.

EDWARD FIELD, OF WESTMINSTER, GREAT BRITAIN.

IMPROVEMENT IN ELECTRICAL ANTI-INCRUSTATORS FOR STEAM-GENERATORS.

Specification forming part of Letters Patent No. 194,666, dated August 28, 1877; application filed May 14, 1877. Patented in England June 28, 1873, for fourteen years.

*To all whom it may concern:*

Be it known that I, EDWARD FIELD, of Chandos Chambers, Adelphi, in the city of Westminster, Kingdom of Great Britain and Ireland, have invented a new and useful Improvement in Preventing the Formation of Scale in Steam-Generators, of which the following is a specification:

My invention relates to the application of electricity for preventing or counteracting scale or incrustation in steam-generators or apparatus for imparting heat to liquids, by connecting the positive electrode of a battery or generator of electricity with the shell or body of the steam-generator or heating apparatus to be protected, passing the negative electrode through the said shell or body, but insulated therefrom, causing such negative electrode to protrude into the water or liquid contained in the steam-generator or heating apparatus, and combining therewith a loose or movable piece or pieces, or terminal or terminals, or cleaning device actuated by the motion of the water or by other means, in such manner as to cause a part or parts of the movable piece or pieces, or terminal or terminals, or cleaning device to work upon or rub against a part or parts of the said negative electrode below the water-line, so as to keep such part clean, free from deposit, and in electric contact with the water.

Figure 1 of the drawings is a general view, showing the application of my invention to an ordinary Cornish boiler.

The battery shown is a constant battery. A copper wire, $a$, is attached to and rises from the copper plate. The zinc plate also has attached to it a copper wire, $b$. The jar $c$ is put into a wooden box or case, $d$, with the wire $b$ to the left hand. The box or case, with the battery and the galvanometer, hereinafter mentioned, are placed and securely fixed on a shelf before the battery is charged. The front side $e$ of the wooden case is hinged at its lower edge, so as to open downward into a horizontal position, and on its inner side it has secured to it, by suitable clips $f$, a galvanometer, $g$, whose needle works freely and comes to rest on the north point. To the piece $h$, running across the top of the front of the box or case $d$, are attached two binding-screws, $i\ i'$. The binding-screw $i$ is in indirect connection with the wire $b$, attached to the zinc plate of the battery. The other binding-screw, $i'$, is connected by a wire, $k$, with one end of the coil of the galvanometer. The other end of this coil is connected with a small V-piece, $l$. $m$ is a spring contact-breaker, which, in its normal position, bears against the V-piece $l$, contact being broken when the free end of the breaker is raised. The other end of the breaker is connected by flexible wire $n$ to the wire $a$, attached to the copper plate of the battery. The binding-screw $i$ is connected by a copper wire, $o$, with the metal rod $p$, made preferably of iron. This rod is square-shaped in cross-section, and at its lower end dips or protrudes into the water in the boiler $r$, and forms the negative electrode of the battery. This negative electrode passes through the shell or body of the boiler without metallic contact or electric connection therewith.

In order to keep a submerged part or parts of this electrode perfectly clean, and to prevent the formation upon it of deposit or incrustation calculated to prevent or retard its efficient action, I connect with a loose or movable piece, terminal, or cleaning device, S, which may consist of a small inverted metal cup or bell, preferably of iron, jointed loosely to the electrode $p$, so as to be capable of swinging freely in any direction, as shown in Fig. 1, without coming into metallic contact with any part of the boiler $r$, such cap being mainly actuated by the rising steam displacing water from within it; or the lower portion of the electrode $p$ may be made of a fork shape, each prong of its forked end being submerged or immersed, and each provided with a small inverted cup or bell, $s$, as shown in Fig. 2; or the electrode, made in the form of a straight rod, may be provided with a cleaning device consisting of a metal float, S, Fig. 3, made water-tight, and having a tube, $s'$, through its center, such tube passing freely around the electrode $p$, so that, as the ebullition of the water causes the float to rise and fall, it shall work upon or rub against a part or parts of the electrode $p$ below the water-line; but I do not confine myself to the precise shapes or arrangements of cleaning devices shown, so long as the electrode $p$ is provided with a loose or movable piece or pieces, or terminal or terminals, or cleaning device for keeping a part or parts of such electrode clean and free from deposit or incrustation, as aforesaid.

The cleaning device S may obviously be moved by mechanical or other means, so long as the actuating apparatus does not form an electric connection between the shell and the electrode $p$. The cast-iron body-piece $t$ is in metallic connection with the boiler through the wrought-iron tube-piece $u$. $v\,v'$ are earthenware insulators, having between them the flange $w'$ of a holding-tube, $w$, over which the insulators are held in position by the cap or cover $x$ and bolts $x'$. The holding-tube has a square hole through it from end to end to receive the square rod $p$. Escape of steam is prevented by the stuffing-box $z$ and square-shaped gun-metal washer $z'$. The shell of the boiler is connected, through the body-piece $t$, wire $k'$, binding-screw $i'$, wire $k$, galvanometer $g$, V-piece $l$, breaker $m$, wire $n'$, and wire $a$, with the copper plate of the battery. The stop-piece $y$ prevents the falling of the electrode $p$.

The dotted arrows in Fig. 1 show what is known as the direction of the electric current, as indicated by the galvanometer when the apparatus is connected with the boiler and properly in action.

I prefer arranging the coil of the galvanometer and attaching the wires thereto in such manner that the battery-current shall deflect the needle toward the east point, and so that what I call the "boiler-current"—that is, a current I have observed from the water to the shell in boilers when steam is up, and which current it is the object of my invention to counteract or reverse, in order to prevent the formation of scale on the surface of the boiler—shall deflect the needle toward the west.

I have found batteries of the kind illustrated, when fed occasionally with crystals of sulphate of copper, to give a steady constant current of the required strength for from twelve to eighteen months without renewal of the zinc plate. I prefer to use insulated wires for conveying the electric current from the battery to the boiler.

I do not confine myself to the precise arrangement of battery or generator of electricity shown. For locomotive or portable and marine boilers a battery must be used which shall be constant, and one that will withstand without injury the vibration to which it will be subjected in such situations. For such purposes I prefer to use the well-known Leclanché battery.

Having described my said invention, and having explained the manner of carrying the same into practical effect, I hereby declare that I do not claim as of my invention, or the exclusive use of, the several parts hereinbefore described and referred to, except when the same are used as and for the purpose specified.

What I do claim is—

1. The combination, in a steam-boiler, of the submerged electrode of a battery with the cleaning device S, loosely connected to the said electrode, substantially as described.

2. The combination, with the rod $p$, of the flanged holding-tube $w$, insulators $v\,v'$, socket $t$, and cap or cover $x$, substantially as described.

EDWARD FIELD.

Witnesses:
W. LLOYD WISE,
   *Patent Agent, London.*
F. J. BROUGHAM, *London.*